United States Patent [19]

Ansley et al.

[11] Patent Number: 5,612,708

[45] Date of Patent: Mar. 18, 1997

[54] COLOR HELMET MOUNTABLE DISPLAY

[75] Inventors: David A. Ansley, Sterling, Va.; William S. Beamon, III, Ormond Beach, Fla.

[73] Assignee: Hughes Electronics, Los Angeles, Calif.

[21] Appl. No.: 636,025

[22] Filed: Apr. 22, 1996

Related U.S. Application Data

[63] Continuation of Ser. No. 261,509, Jun. 17, 1994, abandoned.

[51] Int. Cl.⁶ .................................................. G09G 3/00
[52] U.S. Cl. ........................... 345/8; 340/980; 359/630
[58] Field of Search ..................... 345/7, 8, 9; 359/13, 359/14, 619, 630, 631, 632; 351/158; 340/980; 348/61, 121, 115

[56] References Cited

U.S. PATENT DOCUMENTS

| | | | |
|---|---|---|---|
| 4,449,787 | 5/1984 | Burbo et al. | 345/8 |
| 4,897,715 | 1/1990 | Beamon | 345/8 |
| 5,040,058 | 8/1991 | Beamon | 345/8 |
| 5,091,719 | 2/1992 | Beamon | 345/8 |
| 5,166,778 | 11/1992 | Beamon | 345/8 |

FOREIGN PATENT DOCUMENTS

WO92/18917  10/1992  WIPO ...................... 340/980

*Primary Examiner*—Kee M. Tung
*Assistant Examiner*—Doon Chow
*Attorney, Agent, or Firm*—Michael W. Sales; Wanda K. Denson-Low

[57] ABSTRACT

A lighter weight helmet mountable display (HMD) that is easily adjustable to accommodate variable inter-pupillary distances includes substantially parallel left and right optical channels, and projects left and right images onto the helmet's visor. Each channel includes light sources that form a complete scan line of the image, and project luminance patterns for successive scan lines through a lens which reduces the light's divergence. A deflector is moved to deflect successive luminance patterns back through the lens so that the lens focuses the patterns onto successive scan lines on a back projection screen. The screen emits luminance patterns in response to the incident luminance patterns for each successive scan line to project the image onto the visor.

18 Claims, 3 Drawing Sheets

COLOR HELMET MOUNTABLE DISPLAY

This is a continuation application Ser. No. 08/261,509, filed Jun. 17, 1994 now abandoned.

BACKGROUND OF THE INVENTION

1. Field of the Invention

The present invention generally relates to the field of helmet mountable displays (HMDs).

2. Description of the Related Art

U.S. Pat. No. 5,091,719 describes a helmet mountable display (HMD) in which left and right channels share a common optical path that includes first and second relay lenses having respective optical axes, and horizontal and vertical deflecting mirrors. The lenses are arranged so that their axes form a V, with the deflecting mirrors disposed at the apex. For the left (right) eye, an 8×1 array of fibers is modulated to project the intensity pattern of a 1k×1k image through the first (second) relay lens. A pair of motors oscillate the horizontal and vertical mirrors to deflect light through the second (first) lens, and raster scan the image onto a back projection screen which projects the image onto the helmet's visor.

One of the primary concerns in HMD design is the optical system's overall weight, which is dominated by the weight of the motors used to oscillate the mirrors. Although the described HMD uses a common optical path to reduce the number of lenses, it requires two motors to drive the respective mirrors. Another design consideration is that people who wear the helmet have different interpupillary distances (IPDs). The IPD of male pilots in the 5-95 percentile varies from about 55 mm to about 75 mm. In the 'V' design, variations in IPD are compensated for by rotating the first and second lenses with respect to the apex point to achieve the correct spacing. However, this induces 'parallelogram' distortion in the output image, i.e., a square input appears as a parallelogram, and requires electronic precompensation of the digital imagery.

U.S. Pat. No. 5,166,778 discloses a single lens HMD that employs a single 8×1 array of fibers to modulate both left and right images through a single lens. Horizontal and vertical mirrors are oscillated by respective motors to reflect the intensity patterns back through the lens and onto respective back projection screens. The single lens design reduces the number of lenses, but the single lens must be very large to simultaneously provide images for the left and right eyes, and the system still requires two motors to scan the image. Variations in IPD are compensated by adjusting optical relays between the respective back projection screens and the visor.

A single-eye head mounted projection display called "The Private Eye" is produced by Reflection Technology Corporation of Waltham, Mass. The system includes a column of LEDs which project successive columns of an image through a magnifying lens onto a mirror. The mirror is oscillated to horizontally sweep the projected patterns onto the pupil of the person wearing The Private Eye. The mirror must be relatively large and located near the eye to provide a reasonably large field of view. Additionally, for a two-eyed display, the system would require two drive motors. Since this system is one-eyed, IPD adjustment is not an issue.

SUMMARY OF THE INVENTION

The present invention seeks to provide a lighter weight helmet mountable display that is easily adjustable to accommodate variable inter-pupillary distances.

This is achieved with an HMD having substantially parallel left and right optical channels that project left and right images onto the helmet's visor. Each channel includes light sources that form a complete scan line of the image, and project luminance patterns for successive scan lines through a lens which reduces the light's divergence. A deflector is oscillated to deflect successive luminance patterns back through the lens so that the lens focuses the patterns onto successive scan lines on a back projection screen. The screen emits luminance patterns in response to the incident luminance patterns for each successive scan line to project the image onto the visor.

DESCRIPTION OF THE DRAWINGS

For a better understanding of the invention, and to show how the same may be carried into effect, reference will now be made, by way of example, to the accompanying drawings in which.

DETAILED DESCRIPTION OF THE INVENTION

Figure 1:
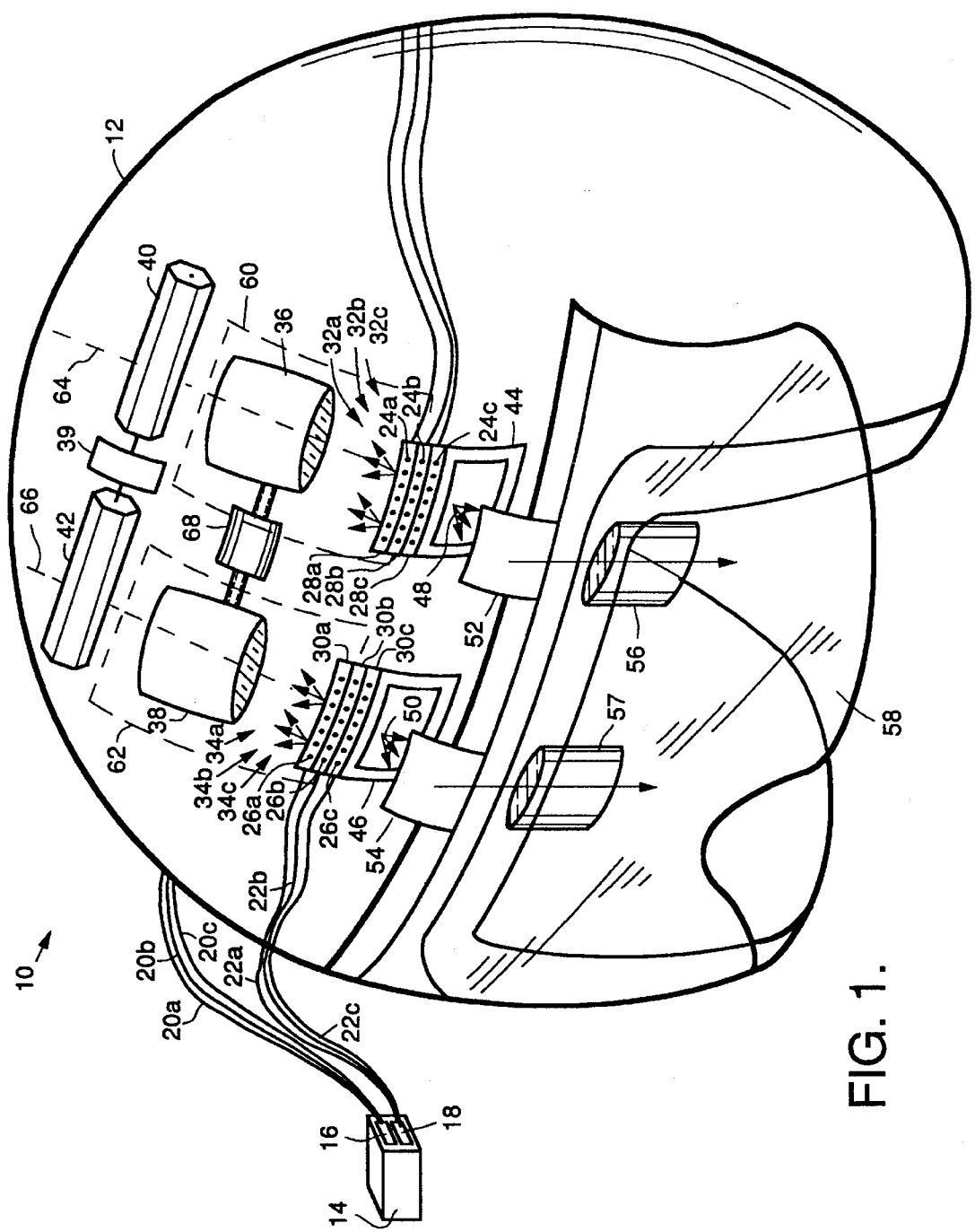
FIG. 1 is a block diagram of a color helmet mountable display (HMD)

FIG. 1 is a top perspective view of an HMD 10 mounted on a helmet 12 for projecting imagery to the left and right eyes of a pilot. The imagery projected to the left and right eyes can be identical (biocular), or it can have stereo disparity (binocular). In this embodiment 1024 by 1024 digital color images are used, with each color image frame for the left and right eyes having separate red, green and blue pixelated intensity patterns. The invention is also applicable to gray scale or single color images of arbitrary dimensions.

A computer image generator 14 produces successive scan lines for left and right color digital images 16 and 18 respectively at a given rate, preferably within a range of fifty to seventy-two images per second, and transmits modulation signals for the red, green and blue (RGB) intensity patterns simultaneously via leads 20a–20c and 22a–22c to left and right RGB light emitting diode (LED) arrays 24a–24c and 26a–26c. The RGB arrays are stacked, with the red array on the top and the blue array on the bottom. The respective arrays in the left and right optical channels each include 1024 LEDs 28a–28c and 30a–30c, and form a complete row or scan line of the color digital image. The left and right LED arrays emit luminance patterns 32a–32c and 34a–34c respectively in accordance with the successive intensity patterns of the image scan lines, and can be addressed sequentially to produce a raster-scanned image or in parallel to project each image a line at a time. Alternatively, a fiber optic ribbon can used in place of the LEDs to project the luminance patterns. The ribbon is connected from the HMD to a laser, LED or CRT line modulator off the helmet.

Figure 5:
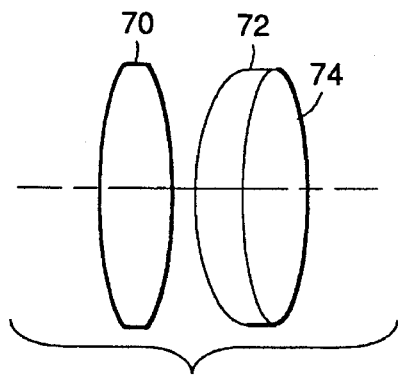
FIG. 5 is a diagram of the relay lens in each optical channel.

Left and right relay lenses 36 and 38 (details of which are shown in FIG. 5) are disposed at their focal length, e.g. 25 mm, from the LED arrays, and collimate the light for the respective luminance patterns. A common drive motor 39 rotates left and right faceted drum mirrors 40 and 42 at a rate synchronized to the modulation rate of the LEDs to deflect the collimated luminance patterns back through the relay lens. The lenses 36 and 38 focus the patterns onto successive scan lines on the back side of left and right back projection screens 44 and 46. A complete color image is projected onto the respective screens by each mirror facet by rotating the drum mirrors in synchronism with the modulation rate of the LEDs, so that each successive horizontal image line is deflected vertically relative to the preceeding line. In this manner a complete frame is projected as a series of vertically spaced image lines. For example, a mirror with 12 facets rotates at 5 revolutions per second to match the 60 hz frame rate. Alternatively, single mirror galvanometers can be used to scan the images. The mirrors oscillate back and forth, but usually only scan the image in one direction.

Figure 2:
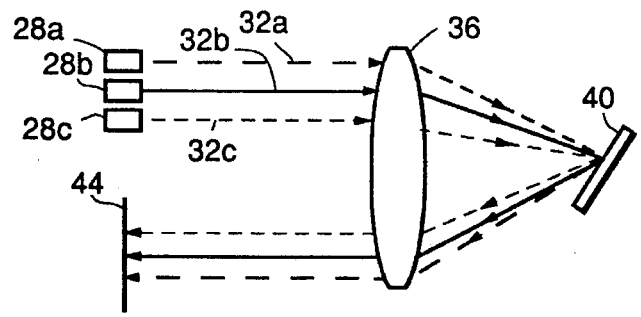
FIG. 2 is a schematic diagram of the HMDs optical channel showing the RGB light sources.

The back projection screens 44 and 46 are positioned at the focal lengths of the lenses 36 and 38 beneath the stacked LED arrays 24a–24c and 26a–26c, so that if light were emitted simultaneously from the RGB arrays for coincident scan lines, it would be deflected onto three separate scan lines on the back projection screens, as shown in FIG. 2. To correct for the spacing between the RGB LED arrays and superimpose the red, green and blue scan lines for a given image scan line, the modulation of the red LEDs is time delayed and the modulation of the blue LEDs is time advanced. For example, if the angular separation between the RGB arrays is 0.1° and the twelve faceted mirror rotating at 5 revolutions per second scans 3600° per second, the time delay/advance of the red/blue modulation signals is 0.1/3600 =27.8 us.

Figure 6:
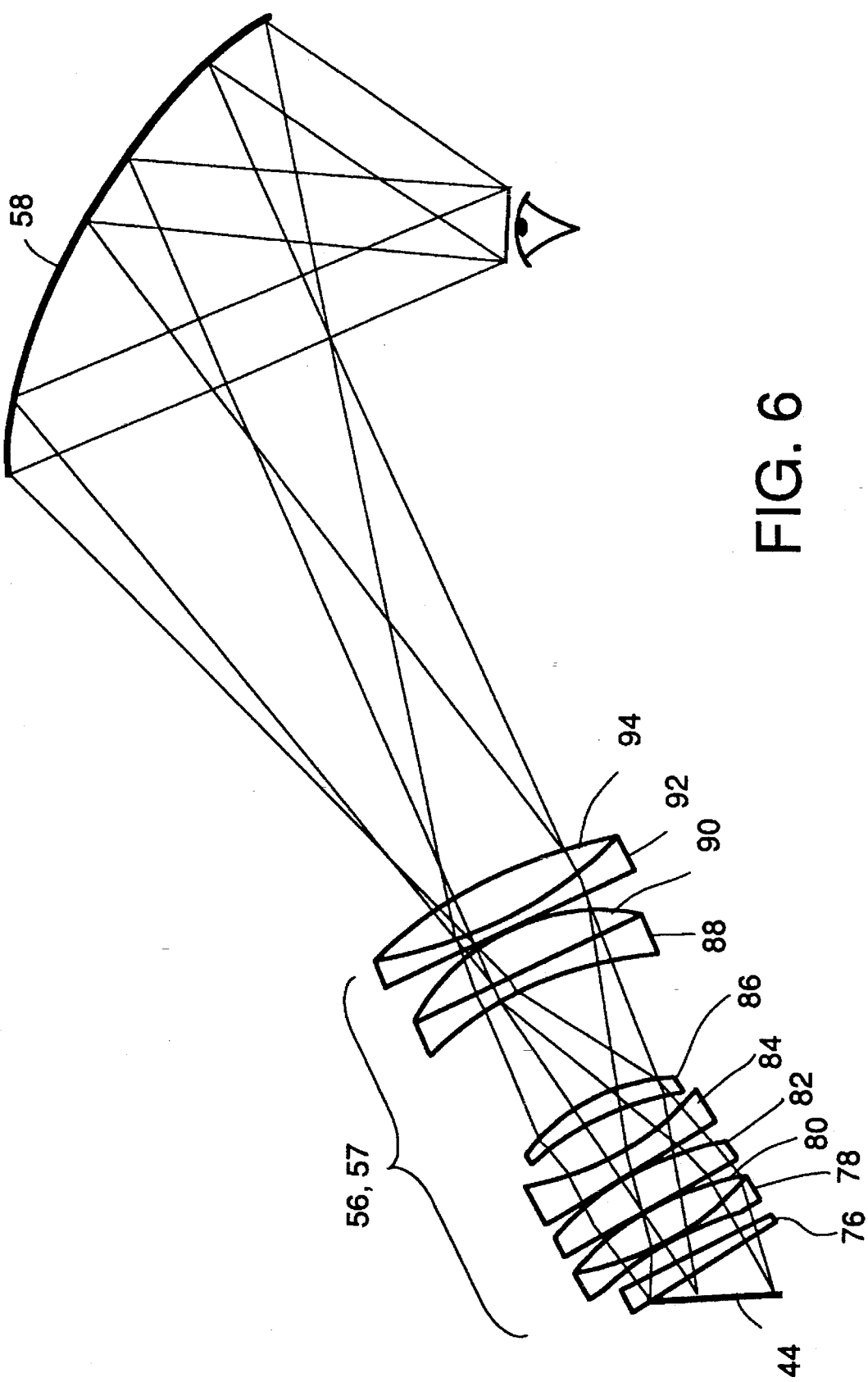
FIG. 6 is a diagram of the relay lens for the visor optics.

The back projection screens 44 and 46 emit color luminance patterns 48 and 50 in accordance with the red, green and blue luminance patterns incident on their back sides. The luminance patterns 48 and 50 are deflected off folding mirrors 52 and 54 through relay lenses 56 and 57 (details of which are shown in FIG. 6) to a visor 58. The relay lenses and visor collimate the divergent light from the back projection screens and deflect the images to the left and right eyes.

Left and right housing structures 60 and 62 hold the relay lens, LED arrays and back projection screen for the respective optical channels so that they are orientated along parallel left and right central optical axes 64 and 66. The LED arrays and projection screens are centered on and perpendicular to the respective central optical axes, and are parallel to the rotation axes of the drum mirrors. A double threaded screw 68 connects the housing structures, which are arranged to slide along the helmet parallel to the screw axis. The screw is used to adjust the spacing between the optical channels by moving them closer together or farther apart, while holding them parallel to each other. This accommodates the IPD of the pilot without changing the respective optical paths, and therefore does not induce any distortion. The screw is manually adjusted for the individual pilot until a test pattern comes into view.

Figure 3:
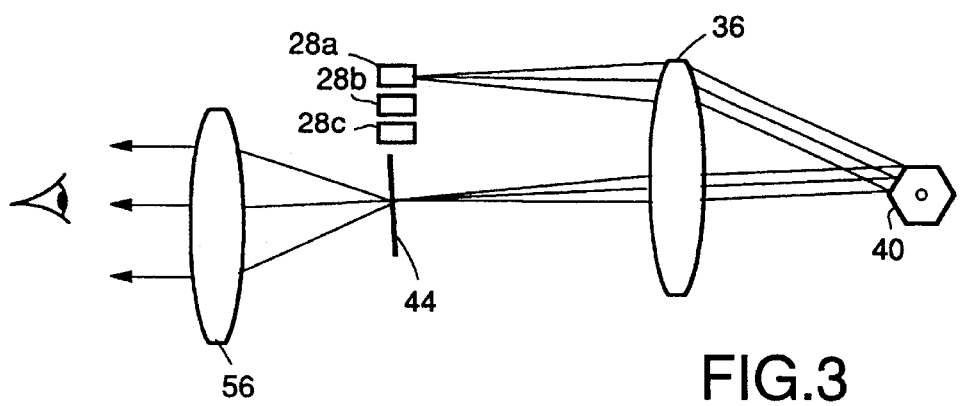
FIG. 3 is a schematic diagram of the HMDs optical path.

FIG. 3 is a schematic diagram of one of the optical channels, and illustrates the light propagation for a single red LED. Light is typically emitted from the LED 28a along an angle of 180°, and a portion of the light propagates through relay lens 36, shown schematically as a simple convex lens having a focal length of 25 mm. The relay lens collimates the light, and a portion of the collimated light deflects off the drum mirror 40. The height of the mirror's facets and the diameter of the relay lens determines the angle of emitted light captured by the lens and deflected by the mirror.

To resolve the individual LEDs in each array, the captured angle must be at least $\lambda/d$ radians, where $\lambda$ is the wavelength of the emitted light and d is the spacing between the LEDs. The ratio $\lambda/d$ is Sparrows resolution limit for resolving point sources. In one particular embodiment, the red LEDs have a spacing of 8 microns and a wavelength of 0.62 microns for a minimum angle of approximately 0.08 radians, or 4.4 degrees. The height of the mirror and the lens diameter are preferably chosen to capture the minimum necessary angle of light, to minimize the weight of the lens, drum mirror and the drive motor. For the single LED, the collimated light is deflected back through the relay lens 36, so that the lens focuses the light onto a single column in successive rows on the back projection screen 44.

In typical HMDs, the wearer's eyes have a movement range (h) of ±7.5 mm over which projected images are visible. The movement can be attributed to the movement of the pupil or to slight shifts in the helmet. The movement range equals the half-width of the lens pupil, and is given by $h=F*Tan(\theta)$, where F is the focal length of relay lens 56 and $\theta$ is the angle of light emitted by the back projection screen. Assuming a focal length of 25 mm, $\theta$ is 16.7°. The images can be projected directly from the mirror to the visor but the range h would be only 1.9 mm, which is insufficient for practical displays. Instead, the design captures the minimum angle necessary to resolve the individual LEDs to limit the helmet's weight, and uses the back projection screens to increase the viewing range of the displayed images.

Figure 4:
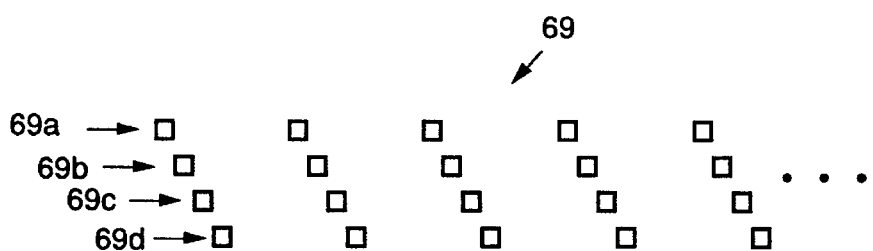
FIG. 4 is a diagram of a staggered array of light emitting diodes.

FIG. 4 is a diagram of a staggered array 69 of LEDs representative of arrays 24a–24c and 26a–26c. If the LEDs were disposed in a single row, they would have to be spaced apart to avoid electrically shorting adjacent LEDs. However, the spacing causes gaps in the projected images. Therefore, the LEDs for a given array are staggered in four rows 69a–69d of 256 LEDs each to eliminate gaps in the projected imagery. If the staggered LEDs were simultaneously projected they would form a non-contiguous array of 1024 LEDs on four separate rows. To correct for the spacing between the rows so that the staggered LED array projects a linear scan line on the back projection screen, the modulation signals to the staggered rows are delayed in a manner similar to the compensation for the separate RGB arrays.

FIG. 5 is a diagram of a particular design for relay lenses 36 and 38 in the respective optical channels. The relay lens is a complex lens with 3 lens elements 70, 72 and 74 that collimate the divergent luminance patterns projected by the LED arrays, and focus the deflected patterns onto the back of the projection screens. The radius of curvature, lens thickness, and glass type are selected in accordance with the desired focal length for the relay lens, and the configuration of the optical channel. Alternative designs and number of elements are possible.

FIG. 6 is a diagram of a particular design for relay lenses 56 and 57 for the visor optics. Each lens comprises ten elements (76–94) of varying configurations. The lens complexity is a result of focusing the three colors at infinity, i.e. collimating the colors, and having the lens pupils coincide with the location of the pilot's eyes for each field of view. Light projected from the back projection screens 44 and 46 propagates through the lens elements and deflects off visor 58 onto the pilot's left and right eyes. The specific radius of curvature, lens thickness and glass type for each of the ten lens elements is determined by the physical dimension of the helmet and the desired size of the displayed image. Alternative lens configurations are also applicable.

The HMD uses an array of light sources that form a complete scan line of the display image, which eliminates one of the scanning mirrors and its drive motor, and reduces the weight of the HMD. The independent and parallel left and right optical channels are easily adjustable to accomodate each pilot's IPD without distorting the image or requiring electronic compensation of the image.

While several illustrative embodiments of the invention have been shown and desribed, numerous variations and alternate embodiments will occur to those skilled in the art. Such variations and alternate embodiments are contemplated, and can be made without departing from the spirit and scope of the invention as defined in the appended claims.

We claim:

1. A helmet mountable display system for displaying left and right pixelated images onto a visor for viewing by a wearer of the helmet, said display system comprising:

left and right optical channels having respective central optical axes that are substantially parallel to each other, each channel comprising:
      an array of light sources forming a complete scan line of said image in one-to-one correspondence with the image pixels, said light sources projecting first divergent luminance patterns for successive scan lines;
      a lens for reducing the divergence of said first luminance patterns;
      a back projection screen positioned to project said images onto the visor;
      a scanning deflector; and
      a deflector actuator controlling said scanning deflector to deflect successive first luminance patterns transmitted through the lens back through said lens so that the lens focuses the patterns onto successive scan lines on the screen's back side, said screen emitting a second luminance pattern for each successive scan line to project the pixelated image onto the visor,
   said deflector actuators in said left and right optical channels comprising a single common drive motor for controlling both deflectors.

2. The helmet mountable display system of claim 1, further comprising an adjustment mechanism for adjusting the separation distance between said parallel channels without moving said deflectors and deflector actuators so that the distance can be set substantially equal to a wearer's inter-pupillary distance.

3. The helmet mountable display system of claim 1, wherein said lens and said deflector capture an angle of the diverging light, the size of the deflector being selected to capture the minimum angle of light needed to resolve the individual sources at the screen.

4. The helmet mountable display system of claim 3, wherein the light projected at said minimum angle along the focal length of said lens provides a first illumination area, and said back projection screen projects said second luminance patterns at another angle to provide a second illumination area larger than the first.

5. The helmet mountable display system of claim 1, wherein said lens collimates the divergent luminance pattern from said light sources.

6. The helmet mountable display system of claim 5, wherein said lens comprises a plurality of lens elements for collimating said divergent luminance patterns, and for focusing said deflected luminance patterns onto said screen.

7. The helmet mountable display system of claim 1, wherein said light sources are light emitting diodes (LEDs).

8. The helmet mountable display system of claim 1, further comprising:
   a circuit for reading out successive scan lines from said images, and modulating said light sources to project the first luminance patterns.

9. The helmet mountable display system of claim 8, wherein said circuit modulates said light sources at a scanning rate, and said deflector actuator moves said deflector at a rate synchronized to said scanning rate.

10. The helmet mountable display system of claim 9, wherein said deflector is a multi-faceted mirror, and said deflector actuator rotates said mirror such that the facets of said mirror deflect respective successive images onto said screen.

11. The helmet mountable display system of claim 8, wherein said circuit reads out said image in a raster scan format, and modulates said light sources sequentially.

12. The helmet mountable display system of claim 8, wherein said circuit reads out said image a complete scan line at a time, and modulates the light sources simultaneously.

13. The helmet mountable display system of claim 8, wherein said array comprises multiple linear adjacent arrays with mutually staggered light sources, said circuit temporally staggering the modulation of the light sources among said arrays such that luminance patterns are deflected from each array onto the same scan line on the screen.

14. The helmet mountable display system of claim 8, wherein said images are color images with red, green and blue (RGB) components, and said light sources include red, green, and blue light source arrays each in one-to-one correspondence with the scan line, said circuit delaying the modulation of the three arrays such that the luminance patterns for the three arrays are coincident on the same projected scan line, and said back projection screen projecting color luminance patterns onto the visor.

15. The helmet mountable display system of claim 1, wherein said array of light sources is linear.

16. A helmet mountable display (HMD), comprising:
   parallel left and right optical channels for projecting left and right images scan lines;
   left and right scanning deflectors;
   a common drive motor for controlling said scanning deflectors to deflect successive image scan lines back through the optical channels to project an image onto a visor; and
   an adjustment mechanism that adjust the spacing between the channels without moving the left and right scanning deflectors to accommodate varying inter-pupillary distances while maintaining the channels parallel orientation to prevent distortion.

17. The HMD of claim 16, wherein said image has a plurality of pixels in each scan line, each optical channel including light sources in one-to-one correspondence with the pixels in each scan line for projecting the image scan lines onto said scanning deflector.

18. The HMD of claim 17, wherein the HMD includes only one pair of scanning deflectors, and said pair of scanning deflectors share only one common drive motor.

* * * * *